UNITED STATES PATENT OFFICE.

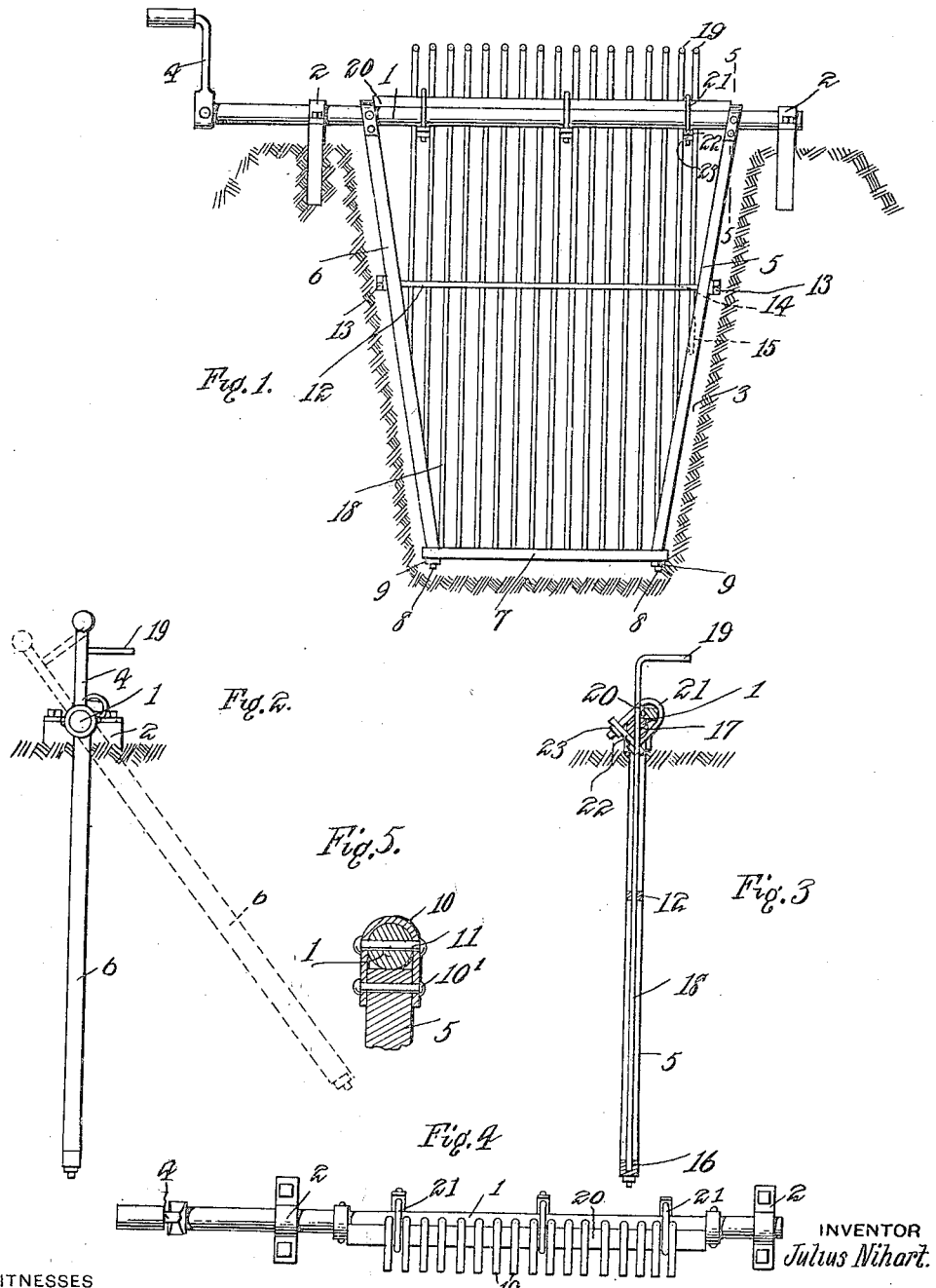

JULIUS NIHART, OF FLAK, MINNESOTA.

FISH-GATE.

1,225,160.  Specification of Letters Patent.  Patented May 8, 1917.

Application filed September 20, 1916. Serial No. 121,238.

*To all whom it may concern:*

Be it known that I, JULIUS NIHART, a citizen of the United States, residing at Flak, in the county of Crow Wing and State of Minnesota, have invented certain new and useful Improvements in Fish-Gates, of which the following is a specification.

This invention relates broadly to irrigation, and more particularly has reference to a fish gate for irrigation ditches.

As the primary object, it is contemplated by this invention to provide a vertical swinging gate for arrangement within an irrigation ditch being adapted to conform to the formation of the body and lie closely in spaced relation with the side walls and bottom to prevent the passage of fish from the main stream into the irrigation ditch.

It is a more specific object of this invention to provide a gate frame for rigid relation with a rotatably mounted shaft; to mount a plurality of uniformly spaced rods in the shaft and the gate frame, to provide means for clamping the rods in position; and also to provide a guard to prevent the fish from jumping over the gate when it is in a closed position.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:—

Figure 1 is a front elevation of my invention in a closed position in an irrigation ditch.

Fig. 2 is a side elevation of my invention.

Fig. 3 is a vertical section of my invention.

Fig. 4 is a top plan of my invention.

Fig. 5 is a sectional detail showing the means for connecting the sides of the gate to the shaft.

Referring more particularly to the drawings in which similar reference numerals designate like and corresponding parts throughout the various views, I provide a shaft 1 the respective ends of the same being journaled in a pair of supports 2 arranged adjacent the sides of an irrigation ditch 3. A crank handle 4 connected to one end of the shaft serves as means to facilitate the rotation thereof when desired.

Rigidly connected to and depending from the shaft so as to conform substantially but in slightly spaced parallel relation with the side walls and bottom of the ditch 3 is my improved gate. In the present instance this gate comprises a substantially U-shaped frame consisting of side pieces 5 and 6 and a bottom piece 7 the respective ends of which are provided with openings for receiving the reduced threaded ends 8 of the sides 5 and 6, said bottom being held in rigid relation with respect to the sides 5 and 6 by means of suitable fastening devices 9. The outer ends of the sides have U-shaped clips 10 rigidly connected thereto as illustrated to advantage in Fig. 1, said clips engaging the shaft and rigidly connected thereto through the medium of suitable fastening devices 11. As is readily apparent upon reference to Fig. 1 it is to be noted that the sides 5 and 6 depend from the shaft in convergent relation with respect to each other. A cross bar 12 is arranged between the side pieces in spaced parallel relation with the bottom, the respective ends thereof being reduced and extended through the sides and engaged by suitable fastening devices such as nuts 13 which clamp them in position so that the bar serves to brace the frame. This bar 12 is provided throughout its length with a plurality of uniformly spaced perforations 14 which are arranged in registration with sockets 15 in the sides 5 and 6 and sockets 16 in the bottom. Likewise the shaft is provided with a plurality of uniformly spaced perforations 17 which are arranged in alinement with openings 14 and sockets 15 and 16.

In order to prevent the passage of small fish through the gate I have provided my improved screening means in the frame. In this instance the screening means consists of a plurality of rods 18 which passes through the registering openings 17, 14, and sockets 15 and 16 so that when finally anchored in the sockets they are arranged in uniformly spaced relation with each other. The upper ends of the rods 18 are arranged above the shaft and have fingers 19 formed by bending the upper ends outwardly at right angles. These fingers 19 are adapted to be arranged in a horizontal plane and in spaced parallel relation with each other so as to coöperate with the upper ends of the rods and serve as a guard to prevent fish jumping over the gate.

In order to prevent the rods from becoming accidentally disconnected from position when the gate is swung in order that it may be cleaned of any debris, I have provided a bar 20 and arranged the same between the shaft and the rods being held in position by my improved clamping means. The clamping means consists of a plurality of U-shaped bolts 21 the outer ends of which are engaged by plates 22 removably held in position by nuts 23, the latter when adjusted serving to hold the bar in frictional engagement with the rods.

It is thought that from the foregoing that the detailed description of the operation of this invention is unnecessary. However, at this point it may be stated that the gate can be cleaned by engaging the handle 4 and rotating the shaft which carries the gate.

Although I have shown and described the preferred embodiment of my invention I desire it to be understood that I am not to be limited to the exact detail shown, however, I desire that great stress be laid upon the arrangement of the vertical swinging screening gate as well as the guarding means thereon for preventing fish from jumping thereover.

From the above description taken in connection with the accompanying drawing, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:

A screening gate for irrigation ditches comprising a shaft adapted to extend transversely over the ditch and to be rotatably supported on opposite sides of the ditch, a frame rigid with said shaft and adapted to depend into the ditch, said frame consisting of side and bottom bars adapted to lie substantially parallel with the walls of the ditch, said shaft and bottom bar having a plurality of spaced openings therein arranged in relative alinement, rods extended through said openings to provide a screen for the frame, the upper ends of said rods being extended at an angle to the frame so as to provide a laterally extending guard, substantially as for the purposes set forth.

In testimony whereof I affix my signature in presence of two witnesses.

JULIUS NIHART.

Witnesses:
H. E. KEMDERT,
T. R. DWYER.

Copies of this patent may be obtained for five cents each, by addressing the "Commissioner of Patents, Washington, D. C."